W. E. WALKER.
NUT LOCK.
APPLICATION FILED NOV. 11, 1912.
1,099,410.
Patented June 9, 1914.
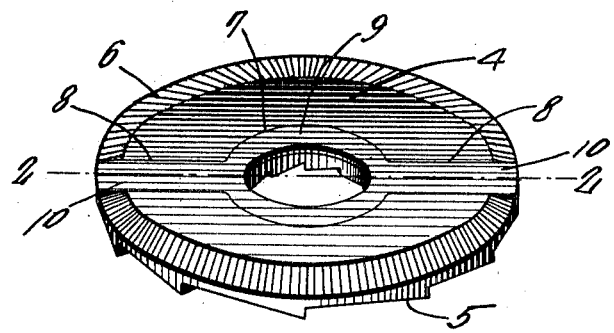
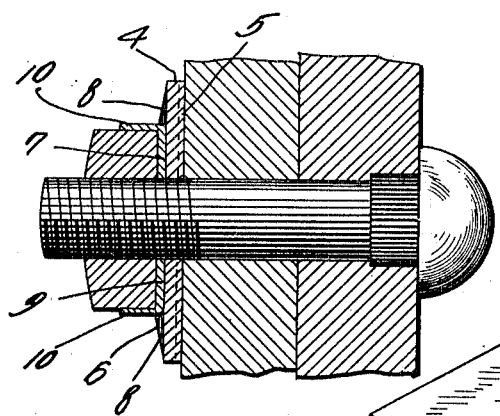
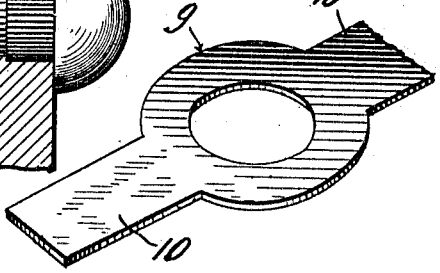
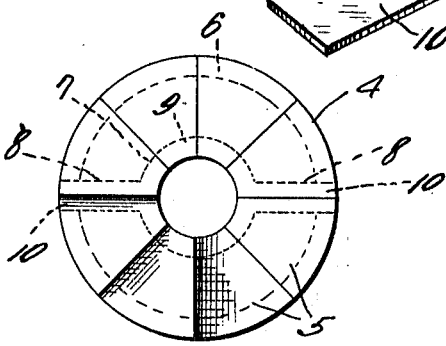
Witnesses
W. E. Walker  Inventor
by    Attorneys

UNITED STATES PATENT OFFICE.

WILLIAM E. WALKER, OF BORDEAUX, WASHINGTON.

NUT-LOCK.

1,099,410.

Specification of Letters Patent.

Patented June 9, 1914.

Application filed November 11, 1912. Serial No. 730,741.

*To all whom it may concern:*

Be it known that I, WILLIAM E. WALKER, a citizen of the United States, residing at Bordeaux, in the county of Thurston and State of Washington, have invented a new and useful Nut-Lock, of which the following is a specification.

The present invention appertains to nut locks, and particularly to washers which are provided with means for constraining them against rotation on a bolt and which are also provided with means for engagement with the nut to lock the nut against turning.

It is the object of the present invention to provide a device of this character which shall be simple, substantial, compact and inexpensive in construction, and which shall be convenient, efficient and serviceable in its use.

To the above ends, the present invention resides in the novel construction and combination of parts hereinafter fully set forth and claimed, it being understood that this device is susceptible of alterations in its details within the scope of what is claimed without departing from the spirit of the invention.

The preferred embodiment of the invention has been illustrated in the accompanying drawing, wherein:—

Figure 1 is a perspective view of the main washer. Fig. 2 is a sectional view of the complete device taken on line 2—2 of Fig. 1, showing the device as in use. Fig. 3 is a plan view of the washer looking toward its inner face. Fig. 4 is an enlarged perspective view of the supplemental washer, partly broken away.

Referring specifically to the drawing, the present invention embodies a relatively thick washer 4, turned or otherwise fashioned from suitable metal, and provided on its inner face with a series of radially extending ratchet teeth 5. The other or outer face of the washer has its edge or margin beveled as indicated by the numeral 6, and an inner annular rabbet 7 is provided in the said face of the washer around the opening in the washer, the said rabbet being comparatively wide and shallow. This washer is also provided with a pair of diametrically opposite channels 8 extending from the rabbet 7 to the beveled edge 6, said channels being preferably wide and being of a depth equal to the depth of the rabbet 7. The channels are relatively smaller in width than the diameter of the rabbet and project radially to the periphery or margin of the washer 4.

In connection with the washer 4, there is employed a supplemental washer 9, which is constructed of sheet metal or other flexible material. This supplemental washer 9 is of a size and thickness to fit snugly within the rabbet 7 so as to be flush with the outer face of the washer 4, and the supplemental washer is provided with a pair of diametrically opposite extensions 10 fitting in the respective channels 8 and having their free ends projecting to the peripheral bevel 6 flush with the periphery of the washer 4. The extensions 10 of the supplemental washer 9 are also flush with the outer face of the washer 4 and fit snugly in the channels 8.

In use, the main washer 4 is passed over the threaded end of the bolt in the usual fashion and brought against the object to be clamped, the supplemental washer also being passed over the threaded end of the bolt and being fitted into the rabbet 7 of the main washer, in which event, the usual nut may be threaded onto the bolt. As the nut is forced inwardly, the main washer is pressed tightly against the object held, so that the ratchet teeth 5 bite or engage the object in order to hold the main washer against rotation on the bolt. The free ends of the extensions 10 may then be bent against the sides of the nut in order to hold the nut against rotation or displacement. The nut is held against rotation inasmuch as the inner ends of the extensions 10 fit within the inner ends of the channels 8 under the nut while the free ends of the extensions 10 rest against the sides of the nut. The supplemental washer in fitting within the rabbet 7 is constrained against shifting transversely of the washer so as not to injure the threads of the bolt, and it will also be noted that the beveled edge 6 of the main washer will facilitate bending the free ends of the extensions of the supplemental washer into engagement with the nut. The bending of the extensions 10 will be facilitated by running a knife or other implement around the bevel 6 so as to engage under the free ends of the extensions. Thus, the free ends of the extensions may be lifted or raised so that they may be readily bent against the sides of the nut.

From the foregoing, taken in connection with the drawing, the advantages and capabilities of the present invention will be evident, and it will be apparent that the object aimed at has been carried out in a satisfactory manner, the present device providing a desirable one for the purposes for which it is designed.

Particular attention is directed to the fact that the washer 4 is mounted on the bolt back of the nut and that the rabbet 7 and supplemental washer 9 are of less diameter than the nut, whereby the supplemental washer will be housed completely under the nut, the side portions or periphery of the nut seating directly against the main washer 4. Thus, the free portions of the extensions 10 are designed to be bent against the respective sides of the nut, it being noted that the extensions are bent intermediate their ends, whereby they may accommodate various sizes or styles of nuts.

Having thus described the invention, what is claimed as new is:—

A relatively thick washer having an outer annular rabbet around its opening, an outer peripheral bevel, and a plurality of radial channels extending from the rabbet to the periphery, the channels being relatively smaller in width than the diameter of the rabbet, and a sheet metal washer fitting snugly in the rabbet and having a plurality of radial extensions fitting snugly within the aforesaid channels, the free ends of the extensions being flush with the periphery of the relatively thick washer.

In testimony that I claim the foregoing as my own, I have hereto affixed my signature in the presence of two witnesses.

WILLIAM E. WALKER.

Witnesses:
E. H. WALTERS,
S. C. MUMBY.

---

Copies of this patent may be obtained for five cents each, by addressing the "Commissioner of Patents, Washington, D. C."